US012627856B1

(12) United States Patent
Li et al.

(10) Patent No.: US 12,627,856 B1
(45) Date of Patent: May 12, 2026

(54) ENHANCING VIDEO CONTENT WITH ATTENTION-BASED COMPLEMENTARY VIRTUAL SOUND OBJECTS

(71) Applicant: Adeia Guides Inc., San Jose, CA (US)

(72) Inventors: Zhiyun Li, Kenmore, WA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/990,312

(22) Filed: Dec. 20, 2024

(51) Int. Cl.
　　*H04N 21/439* (2011.01)
　　*H04N 21/44* (2011.01)
　　*H04N 21/442* (2011.01)
　　*H04N 21/81* (2011.01)

(52) U.S. Cl.
　　CPC ... *H04N 21/4394* (2013.01); *H04N 21/44008* (2013.01); *H04N 21/44218* (2013.01); *H04N 21/8106* (2013.01)

(58) Field of Classification Search
　　None
　　See application file for complete search history.

(56) References Cited

U.S. PATENT DOCUMENTS

| | | | | |
|---|---|---|---|---|
| 10,594,757 | B1 * | 3/2020 | Shevchenko | H04N 7/148 |
| 10,897,637 | B1 * | 1/2021 | Pham | H04N 21/23406 |
| 12,475,367 | B2 * | 11/2025 | Sorci | G06N 3/045 |

| | | | | |
|---|---|---|---|---|
| 2024/0103686 | A1 * | 3/2024 | Pazmino | H04L 67/12 |
| 2024/0273793 | A1 * | 8/2024 | DeCharms | G06F 40/197 |
| 2024/0402984 | A1 * | 12/2024 | Verweij | G06F 3/04815 |
| 2025/0330673 | A1 * | 10/2025 | Mainar Jovani ... | H04N 21/4223 |

OTHER PUBLICATIONS

"The Audio Description Project", Available online at: <https://adp.acb.org/index.html>, 2025, 3 pages.
Activity Recognition API, "Adapt your app by understanding what users are doing", available online at: <https://developers.google.com/location-context/activity-recognition>, retrieved on Jan. 30, 2025, 3 pages.

(Continued)

*Primary Examiner* — James R Marandi
(74) *Attorney, Agent, or Firm* — HG LAW LLP

(57) ABSTRACT

The present disclosure is directed to systems and methods for incorporating additional sound cues based on an attention level. In some embodiments, the systems and methods generate for output a content item comprising visual and audio components. In some embodiments, the systems and methods determine an attention level respective to the content item. In some embodiments, the systems and methods identify an object depicted in the content item. In some embodiments, the systems and methods, based on determining the attention level is below a threshold, and based on determining the audio component lacks sound attributable to the object, generates an additional audio component for the object. In some embodiments, the systems and methods generate for output the additional audio component with the audio component. In some embodiments, the systems and methods, based on the attention level above the threshold, modify the output to cease playing the additional audio component.

20 Claims, 14 Drawing Sheets

(56) References Cited

OTHER PUBLICATIONS

Arcore, "Understand the user's environment with the Scene Semantics API", available online at: <https://developers.google.com/ar/develop/scene-semantics>, retrieved on Jan. 30, 2025, 4 pages.

AWS, "Improving Video Quality", available online at: <https://aws.amazon.com/media/tech/improvi>, retrieved on Jan. 29, 2025, 3 pages.

Developer, "CMMotionActivity", available online at: <https://developer.apple.com/documentation/coremotion/cmmotionactivity>, retrieved on Jan. 29, 2025, 3 pages.

Gao, G., et al., "Content-Aware Personalised Rate Adaptation for Adaptive Streaming via Deep Video Analysis", retrieved on Jan. 29, 2025, 16 pages.

Guzhov, A., et al., "AudioCLIP: Extending Clip to Image, Text and Audio", arXiv:2106.13043v1, Jun. 24, 2021, 14 pages.

Hulu, "Video quality on Hulu", available online at: <https://help.hulu.com/article/hulu-video-quality>, retrieved on Jan. 29, 2025, 5 pages.

Li, L-J., et al., "Towards Total Scene Understanding: Classification, Annotation and Segmentation in an Automatic Framework", Computer Vision and Pattern Recognition (CVPR), 2009, 8 pages.

Netflix Technology Blog, "Per-Title Encode Optimization,", available online at: <https://netflixtechblog.com/per-title-encode-optimization-7e99442b62a2>, Dec. 14, 2015, 22 pages.

Reddit, "YouTube stops playing my video when I am not looking at my phone screen", available online at:<https://www.reddit.com/r/techquestions/comments/1c960c6/youtube_stops_playing_my_video_when_i_am_not/?rdt=35031>, retrieved on Jan. 29, 2025, 3 pages.

Samsung, "Look away from the video to pause", available online at: <https://r2.community.samsung.com/t5/Tech-Talk/Look-away-from-the-video-to-pause/td-p/7329788>, Feb. 27, 2021, 3 pages.

Samsung, "What is Smart Pause in Samsung Galaxy S5(SM-G900H)?", available online at: <https://www.samsung.com/in/support/mobile-devices/what-is-smart-pause-in-samsung-galaxy-s5/>, Oct. 27, 2020, 3 pages.

Samsung, "What is SmartPause feature in Samsung Galaxy S4(GT-I9500)?", available online at: <https://www.samsung.com/in/support/mobile-devices/what-is-smartpause-feature-in-samsung-galaxy-s4/>, Oct. 13, 2020, 3 pages.

Tang, X., et al., "Intelligent Video Streaming at Network Edge: An Attention-Based Multiagent Reinforcement Learning Solution", Future Internet, vol. 15, No. 7, Jul. 3, 2023, 18 pages.

Wikipedia, "Attention (machine learning)", available online at: <https://en.wikipedia.org/wiki/Attention_(machine_learning)>, retrieved on Jan. 29, 2025, 9 pages.

Wikipedia, "Kalman filter", available online at: <https://en.wikipedia.org/wiki/Kalman_filter>, retrieved on Jan. 29, 2025, 40 pages.

YouTube Help, "Change the quality of your video", available online at: <https://support.google.com/youtube/answer/91449?hl=en>, retrieved on Jan. 29, 2025, 2 pages.

Zhang, X., et al., "SENSEI: Aligning Video Streaming Quality with Dynamic User Sensitivity", NSDI 21, available online at: <https://www.usenix.org/conference/nsdi21/presentation/zhang-xu>, Jan. 29, 2025, 3 pages.

* cited by examiner

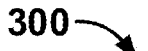
300
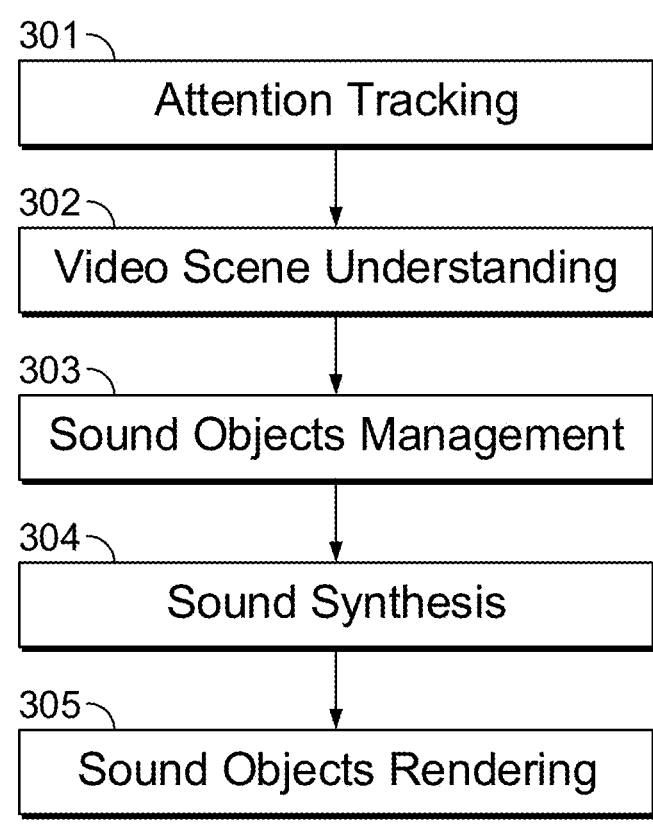
301 —
Attention Tracking
302 —
Video Scene Understanding
303 —
Sound Objects Management
304 —
Sound Synthesis
305 —
Sound Objects Rendering
FIG. 3

Wind blowing

Open space sound effects

Ocean wave noise

Heavy breathing

Metal grinding

Cloth flapping

Ship engine and moving noise

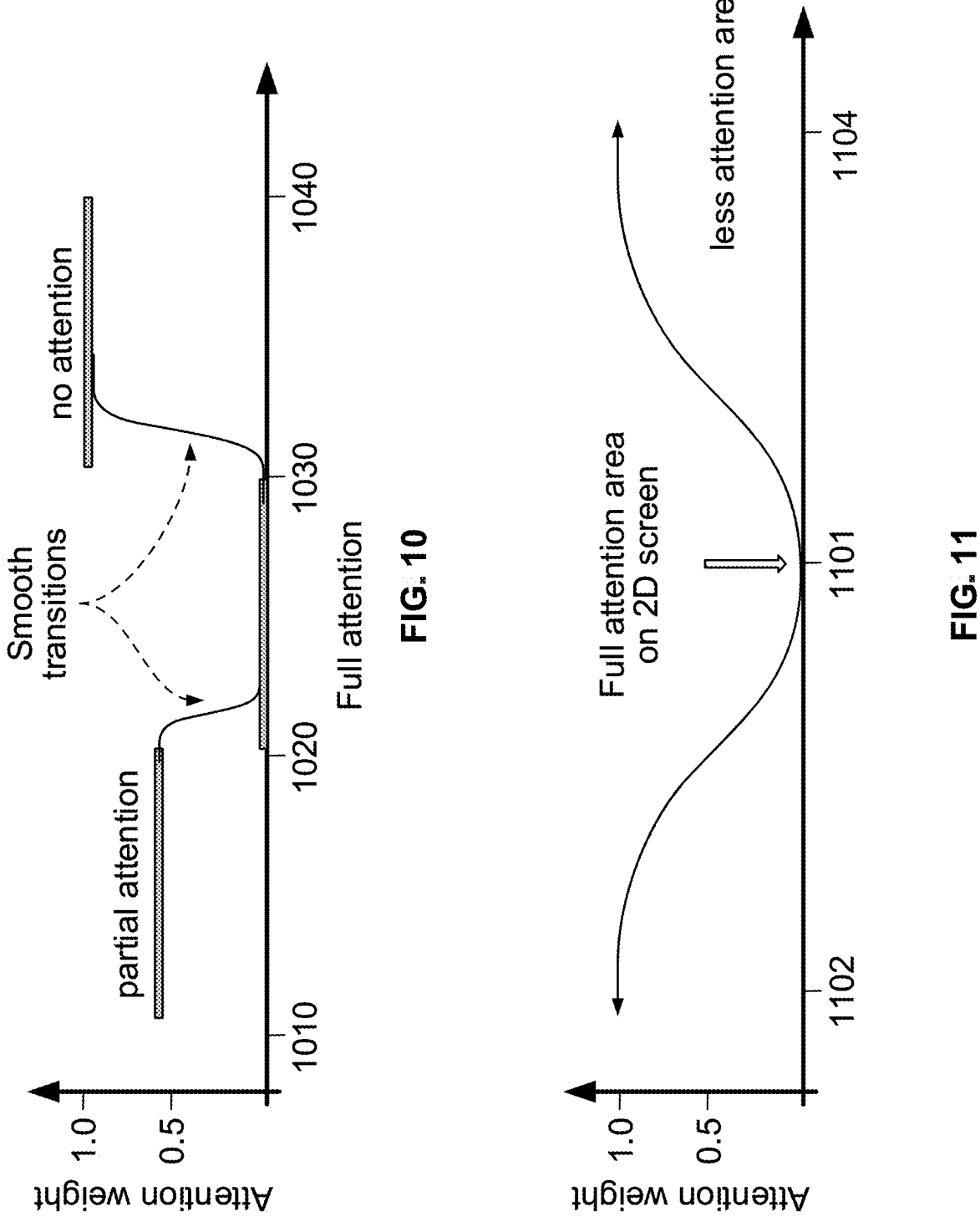

ENHANCING VIDEO CONTENT WITH ATTENTION-BASED COMPLEMENTARY VIRTUAL SOUND OBJECTS

BACKGROUND

The present disclosure is related to systems and techniques for enhancing video content with supplemental audio.

SUMMARY

The present disclosure relates to presenting additional audio for visual cues in a content item. In some embodiments, the described systems monitor the attention (e.g., by detecting interaction with another device) or gaze of a viewer (e.g., using a camera) to determine if additional sounds would enhance display of the content item. The additional sounds may be generated or prerecorded sounds associated with objects in a scene of the content item. In some embodiments, the system playing additional sounds provides context for settings or events. In some embodiments, the system analyzes a scene in a content item to determine what sounds will provide information important to the context or storyline of the content item.

In today's fast paced world, viewers have access to continuous streams of information, ideas, and connections via many devices. With constant access to new information, viewers often watch video content or listen to audio content while also consuming information, such as social media, via the same or another device. As a result, the attention of a viewer is often split between two or more applications or content streams. In such a scenario, a viewer gives the content on one device only partial attention while they also consume or interact with content on another device (e.g., a phone) at the same time. In some circumstances, a viewer might not be looking at the screen on which the content stream is presented. For example, if the viewer places a smartphone playing content in his or her pocket, or if the viewer is working in another window that covers the playing content, the viewer cannot see the visual component of the content stream. However, even in these scenarios, the viewer is often listening to the content's audio component. Still, as a result of the limited attention level, the viewer will likely miss key details of the displayed content stream. In particular, the viewer is most likely to miss details that the content streams convey through visual cues. This disconnect causes content streams to ineffectively convey information, only partially reaching the viewer. Further, as a result of this inefficiency, a viewer may also request to replay the content. This result causes additional stress on the system as the system uses limited resources, such as network and computing power, to replay already presented content.

In one approach, a system tracks the gaze of the viewer to approximate an attention level and pauses the content if it detects that the viewer is looking away. However, such an approach can be disruptive, and unexpectedly stop output of the content. For example, a system may pause the content when a viewer looks away despite the viewer still being engaged and listening.

In another example, a system provides textual descriptions, composed in advance, of visual components of a scene. These descriptions provide information to members of the audience who might benefit from additional information, such as the visually impaired. In many scenarios, the system reads the textual descriptions aloud so that audience members may receive this information audibly rather than visually. While these descriptions can, in certain situations, provide useful details to viewers, the spoken details also may disrupt the natural flow of a content presentation, obscure dialogue and sounds, and distract audience members. This approach further requires considerable analysis and output resources, which can strain the system.

The present disclosure describes systems and techniques for unobtrusively providing supplemental information in a content presentation, where the supplemental information conveys information to the audience that previously was only available through the visual component of the content. For example, the system may add sounds of footsteps to indicate, through sound rather than visuals, that a character has entered a room. In some embodiments, the system adds this supplemental information upon detecting that an audience attention level is low. Unlike some approaches, the described techniques continue playing the content. In some embodiments, the system plays supplemental information with the original, or near to original, content presentation. This approach limits disruptions to the content stream while effectively conveying information to distracted viewers In some embodiments, the systems and techniques monitor (e.g., using a sensor) the attention level of one or more viewers, and supplement the content stream with the additional sounds when one or more attention levels are below a threshold. In some embodiments, the systems and techniques use computer vision algorithms to analyze the visual characteristics of a scene to determine valuable information a viewer is likely to miss if not giving full attention. For example, a video scene understanding algorithm may be used to recognize objects and events in the content item stream. For example, the systems and techniques can analyze a frame with Convolutional Neural Networks (CNNs) to perform image classification or feature extraction to detect objects in the frame. In some embodiments, sound object management software categorizes the recognized objects and events, and determines or identifies those objects and/or events that are most important to understanding the content item. For example, the systems and techniques compute importance scores for the recognized objects using one or more criteria, such as size based importance (objects that are bigger are more important), movement based importance (objects that are moving faster are more important), speech based importance (objects that match what is in subtitles may be more important), semantic based importance (objects in certain categories like humans are more important), frequency based importance (objects that appear more frequently may be more important), or any other suitable importance measurement, or weighted combination of the above. In some embodiments, the sound object management software also identifies sounds commonly associated with the objects and events. For example, if the video scene understanding algorithm recognizes a dog, the sound object management software identifies barking as an associated sound. Sound object rendering software then generates the associated sound for presentation with the content item stream.

In one example, a system supplements a content stream with additional sounds when it detects that a viewer attention level is below a threshold. The system may detect an attention level using a sensor that, for example, collects data regarding the eye movement or other activity of a viewer. The system then calculates an attention level based on this data. The system monitors the attention level, and may revert to the original content stream upon detection that an attention level is above a threshold. The system continues to monitor the viewer attention level throughout the presentation of the content, and supplements the content stream or reverts to the original presentation based on the detected attention level at a given moment, to thereby continually augment and/or revert over the course of the presentation.

In one example, the system tracks attention levels pertaining to different regions of the content stream. For example, the system detects that an attention level is high on the right side of a screen, but low on a left side. In this example, the system supplements the content stream with sounds representing activity on the side for which attention is low, here the left side, to ensure that the system conveys information in that region.

These approaches give audio cues of information that a viewer is unlikely to otherwise receive. These cues help to avoid the need for excessive voice-over details or unnecessary pausing, both of which waste system resources, and instead allow the system to present content as planned, even during periods of low attention, at a reasonable cost to the system.

BRIEF DESCRIPTION OF THE DRAWINGS

FIG. 3 shows an example process in accordance with some embodiments of the present disclosure;

FIG. 10 shows an example mapping of attention weight to attention level in accordance with some embodiments of the present disclosure;

FIG. 11 shows an example mapping of attention weight to screen position in accordance with some embodiments of the present disclosure;

DETAILED DESCRIPTION OF THE DRAWINGS

The present disclosure describes, at least in part, systems and methods for adapting content item audio output according to a detected attention level of a viewer.

Figure 1:
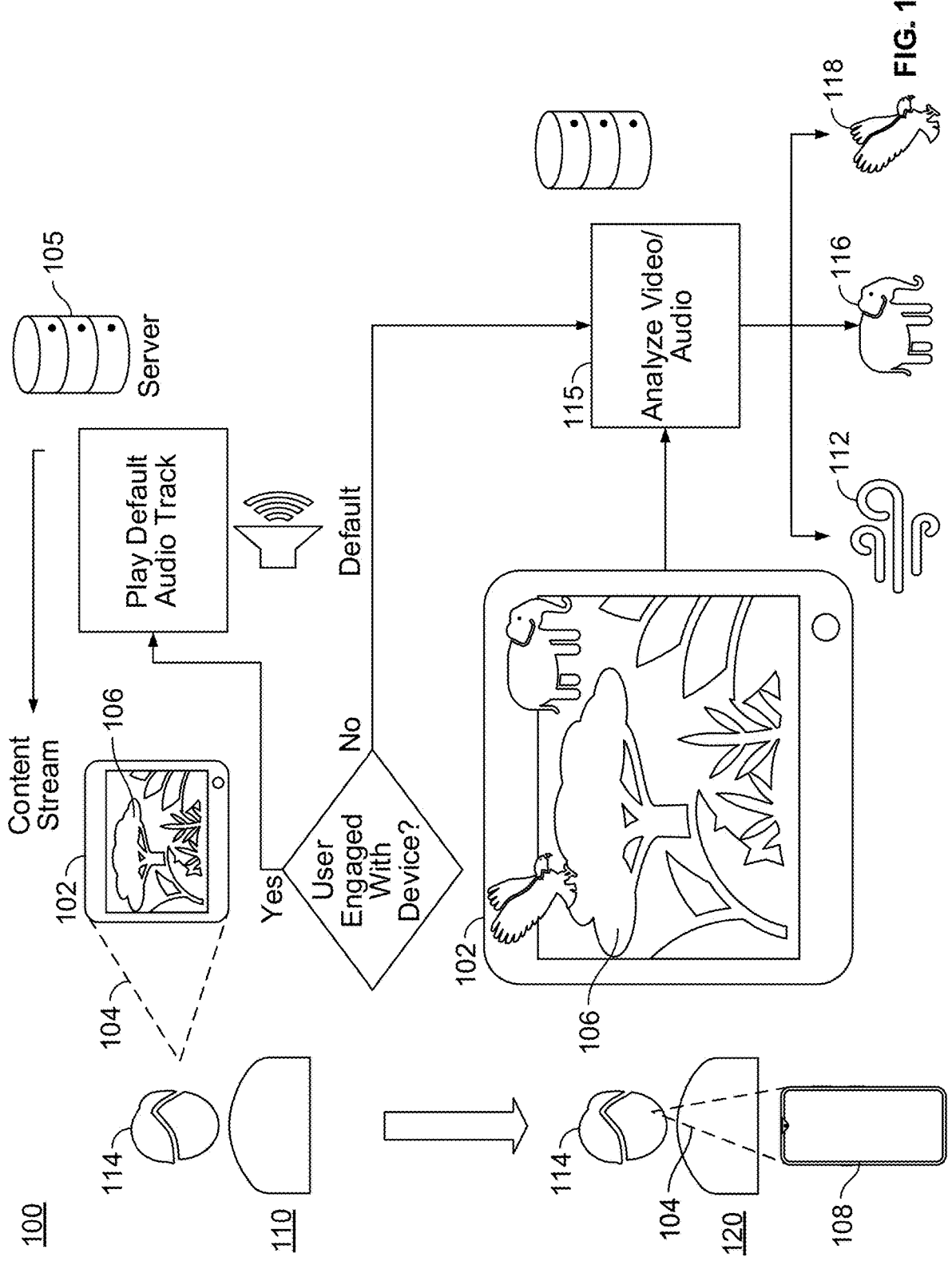
FIG. 1 shows an example process in accordance with some embodiments of the present disclosure.
Figure 1:
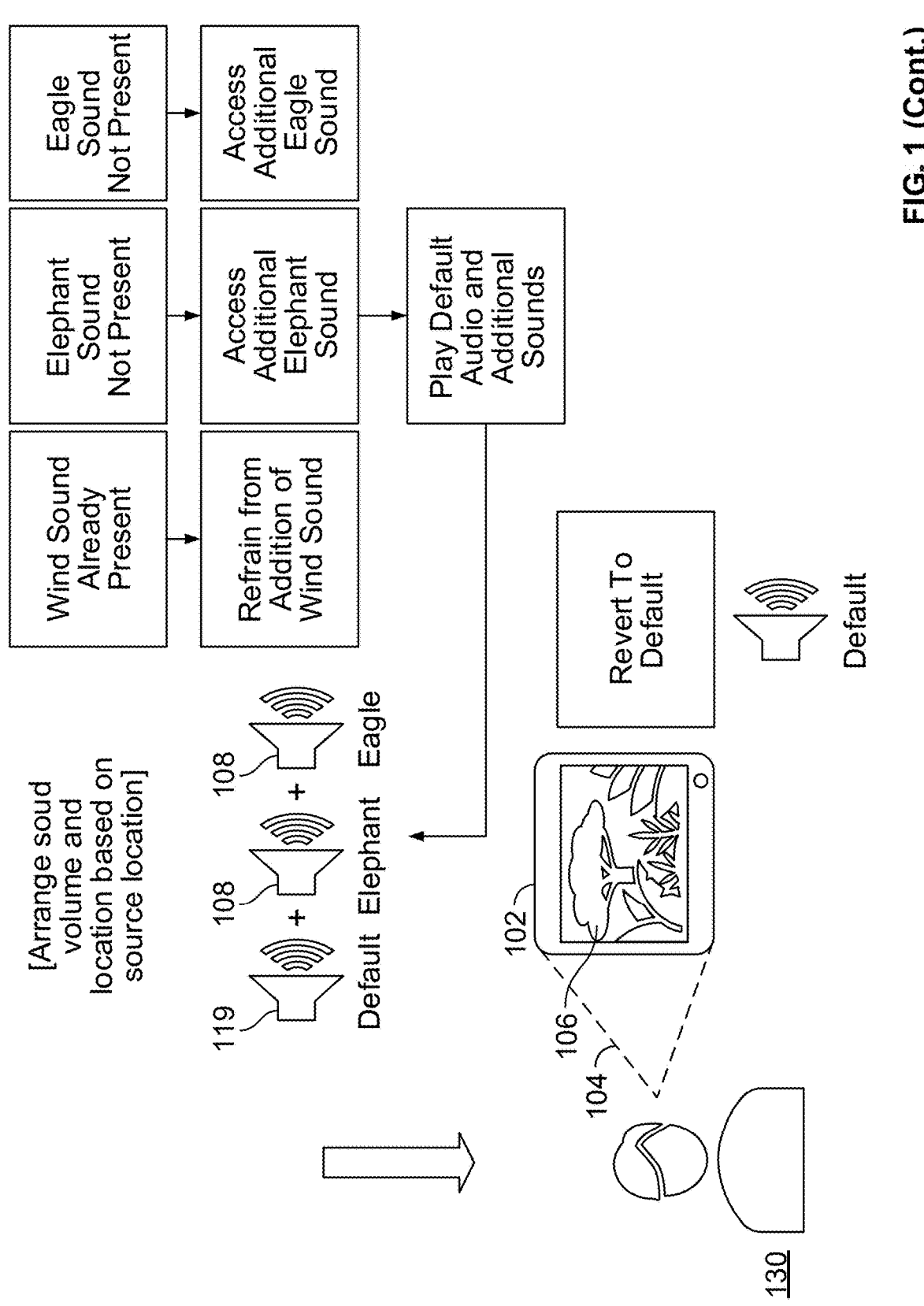

FIG. 1 shows an illustrative system for supplementing audio output based on a content presentation system detecting a viewer attention level, in accordance with some embodiments of this disclosure. The techniques shown in FIGS. 1-14 may be implemented at least in part by content presentation system 100. In some embodiments, the content presentation system 100 provides additional sound objects to a content item stream based on detecting that a viewer's gaze is not focused on at least a portion of the display. Content presentation system 100, in the example shown in FIG. 1, comprises display device 102 and server 105, and/or any other suitable devices, servers, databases, and/or other components.

Content presentation system 100 may be executed at least in part at one or more client devices (e.g., display device 102) and/or at any other suitable computing device(s). Content presentation system 100 may be configured to perform the functionalities (or one or more portions thereof) described herein. In some embodiments, content presentation system 100 may comprise or be incorporated as part of any suitable application or software. For example, a media application that presents media content items through control circuitry may incorporate the content presentation system 100. In such an embodiment, the control circuitry of the media application may also execute the functions of the content presentation system 100. In some embodiments, the content presentation system 100 may run on a server, client, or combination thereof. For example, in such an embodiment, a display device may communicate with a server to request and receive data or content from the content presentation system 100. The server may execute and transmit, for example through a cloud, all or part of the data to the content presentation system 100

As shown in FIG. 1, at point 110, device 102 generates for output content stream 106 (e.g., for viewer 114). Display device 102 may be any device for displaying video content, such as a television, smartphone, PC, or tablet. The content presentation system 100 detects an attention level of viewer 114 via a sensor in communication with content presentation system 100, such as a camera within display device 102 or a standalone device connected to display device 102. The attention level represents an extent to which the viewer 114 is engaged with the content stream 106. For example, the content presentation system 100 may track eye movements of viewer 114 using a camera and eye tracking techniques. In some embodiments, the content presentation system 100 determines the attention level based on activity tracking. For example, using sensors on mobile devices the content presentation system 100 detects whether the viewer 114 is engaged in activities like walking, running, or sitting still, which can indicate that their level of attention on the content stream 106 is low. In some embodiments, the content presentation system 100 may track the viewer's 114 attention level by checking whether the video window is visible or partially visible, determining window size and resolution, or analyzing other display qualities. In some embodiments, the content presentation system 100 may track engagement or interaction on a secondary device, such as touch screen inputs on a smartphone, through communicating with the secondary device and receiving from that device data regarding interactions. The content presentation system 100 may also track engagement with other applications, whether on display device 102 or a second device. For example, the content presentation system 100 may track when a device is engaged in a phone or video call, messaging, email, gaming, or other activity. Each of these applications may indicate to the content presentation system 100 that viewer 114 is less than engaged with the content stream 106. For example, a viewer 114 who is emailing will divide attention between reading and/or drafting email and the content stream 106.

Using a detected attention level, the presentation system 100 may adjust the output of the content stream 106 to better fit the needs of the viewer 114, the network, a processor, or other entity. For example, if the presentation system 100 detects a low attention level from a viewer, it may determine that the visual component of the content stream 106 is less important and therefore reduce resources rendering a visual component of the content stream 106 to conserve computing and electrical power. In other another example, if the presentation system 100 detects a low attention level, it may add additional audio to the content stream 106 to provide easy to grasp context, and ensure that the content presentation system effectively conveys important details.

At time point 110, content presentation system 100 detects, for example via sensors embedded in display device 102, that the full gaze 104 of the viewer 114 is directed at content stream 106. Content stream 106 may be any content item with a visual component such as a film, television show, e-book, videogame, AR/XR content, or workspace. In some embodiments, the server 105 sends the content stream 106 for display on the display device 102.

In the example at time point 110, the content presentation system 100 determines that the full attention of the viewer 114 is on the content stream 106. Content presentation system 100 determines that this attention level is above a given, preset, or calculated threshold attention level, meaning the viewer 114 is giving enough attention to receive visual cues and that providing supplemental information is not necessary. Based on the attention level detection, content presentation system 100 does not adjust the audio component of content item 106, and the default, or original, audio is presented.

The attention level threshold may affect any number of results. For example, falling below a threshold level may cause the content presentation system 100 to add additional sounds in some embodiments. Falling below a threshold may also, in other examples, cause the content presentation system 100 to adjust the volume of the additional sounds. In some embodiments, reaching or falling below a threshold level may cause the content presentation system 100 to add or remove sound location, such as directional, information to the additional sounds. For example, sound location information may define from which direction the sound should appear to originate from. For example, if a character walks on screen from the left side, the content presentation system 100 may instruct presentation, for example via speakers, to output sound that gives an impression that the sound related to the character's steps are coming from the left. For example, in this case, the left speaker may output sounds of the character's steps while the right speaker may not. In another example, if the content presentation system 100 has access to surround sound, it might direct sound output from a more specific direction. For example if an airplane is flying in the content stream 106 overhead towards the right of the screen, sounds related to the airplane may sound like they are also overhead and towards the right of the viewer. In some embodiments, the content presentation system 100 may define sound output using a 360-degree vector. The content presentation system 100 may output the effects of the sound location using a combination of strategically spaced speakers which generate sound from their given positions, such as, the left, right, up, down, front, and back of a viewing space or set up. For example, if the content presentation system 100 detects an attention level below a threshold, indicating a middle level of attention, the content presentation system 100 might assume that the viewer is in front of the content item, and that, in that case, location information (that defines a direction from where the sound will originate) may be useful for the additional sounds. However, if the content presentation system 100 detects an attention level below a threshold, indicating relatively low attention, the content presentation system 100 may assume that a viewer is not near the content stream, and therefore location information would not be useful.

In some embodiments, the content presentation system 100 utilizes more than one threshold. For example, the content presentation system 100 may include a threshold linked to the inclusion or provision of additional sounds. The content presentation system 100 may also include a second, different, and in some cases higher, threshold for removing the additional sounds. In some embodiments, the content presentation system 100 includes a threshold to add additional sounds and further thresholds that control volume of the additional sounds. Other thresholds may be linked to further features still, including, for example, adding location data to sounds.

At point 120, content presentation system 100 detects that the gaze 104 of the viewer 114 is directed away from the content stream 106. For example, the viewer 114 may be looking at other content on the display device 102, or away from the display device 102 entirely. In the example shown in FIG. 1, viewer 114 turns away to look at a phone 108. In some embodiments, the detected gaze 104 may indicate that the viewer 114 is focused on only a portion of the content stream 106, and accordingly the viewer 114 will miss visual details in other portions.

However, even if the content presentation system 100 detects that a viewer, such as viewer 114, is not watching a content item, the viewer is often listening. Based on a detection of low or partial attention, that is, an attention level below a threshold attention level, the content presentation system 100 plays additional sound 108 to compensate for the missed visuals. The sounds are generated or stored sounds linked with an object, herein referred to as a sound object, represented in the content stream 106. Sound objects are objects that are associated with sounds and that provide information about the content item. For example, in some embodiments, the content presentation system 100 may provide additional sounds that indicate a scene setting or event, where the scene or event is a sound object.

If the content presentation system 100 detects that a viewer has an unfocused gaze 104—that is, a gaze focusing on no or only part of the content stream 106—in embodiments in which the content item conveys these details using visual cues, he or she will miss this information. In some circumstances these visual cues may be helpful, if not crucial, to understanding the content item. The additional audio accommodates this unfocused gaze by supplementing the content stream 106 with additional information through an audio component.

To add additional audio, the content presentation system 100 first analyzes the audio and visual components of the content stream 106 to identify sound objects in the scene of content stream 106 with associated sounds that can help inform viewer 114 of the plot, context, or other valuable information in the content stream 106. The additional sounds help a viewer 114 that is only listening to content stream 106 to follow the storyline of the content stream 106 by accommodating the lack of visual information of the viewer when looking away. For example, in the embodiment shown in FIG. 1, the content stream 106 shows a jungle scene. If the content presentation system 100 detects that viewer 114 looks away, only listening to the content stream 106, the viewer may not know where the scene takes place. The content presentation system 100 detects that the viewer is not watching the content stream, analyzes the scene to determine key visual elements, or sound objects, and identifies sounds to convey similar information as the determined key visual elements. Here, the content presentation system 100 recognizes, upon analyzing the content stream, that the setting is a key visual element. The setting, here a jungle, has associated sounds, and therefore the setting may be a sound object. The content presentation system 100 then recognizes, through sound detection software, that the default audio does not clearly convey the setting. To convey this information to viewer 114 audibly, the content presentation system 100 selects from a database or generates itself sounds indicative of a jungle setting. For example, in the example shown in FIG. 1, the content presentation system 100 determines that animal sounds are not present when the content presentation system 100 analyzes the default audio component. It then accesses, through a database or generation, animal sounds common in a jungle, here, an elephant sound 116 and an eagle sound 118, to add to the existing audio component, the default audio, of the content stream 106. These sounds give viewer 114 an impression of a jungle, letting him or her know of the setting of the scene.

In some embodiments, the content presentation system 100 adds the additional sounds by mixing them with the default or original audio. For example, in FIG. 1 at timepoint 119, the content presentation system 100 plays default audio and additional sounds together. In some embodiments, the content presentation system 100 plays the additional audio as a separate channel or component. The content presentation system 100 may also, in some embodiments, analyze existing sounds to enhance or suppress them according to the attention determination and additional sounds added. In the embodiment in FIG. 1, the content presentation system 100 recognizes that the original content stream 106 includes wind sound 112. The content presentation system 100 analyzes this sound and determines that it provides information useful to convey information about the scene. The content presentation system 100 does not remove the wind sound 112 and leaves it at the default level.

At timepoint 130, the content presentation system 100 detects that the viewer's gaze 104 returns to the display device 102. The content presentation system 100 determines, based on data from a sensor tracking the attention level of the viewer 114, that the viewer 114 is watching the content stream 106. The content presentation system 100 then returns the audio component of the content stream to its original settings, removing both the elephant and eagle sounds.

In some embodiments, the content presentation system 100 continually monitors the attention level of viewer 114 throughout the presentation of the content stream 106 and adjusts the audio output based on the detected attention level. In such an embodiment, therefore, the content presentation system 100 repeatedly supplements the audio of the content stream with additional sound objects and then repeatedly reverts back to the original audio component of the content stream as appropriate throughout the presentation of the content stream 106. Such supplementation and reversion may happen several times over the presentation of one content stream 106 as a viewer 114, for example, looks away from the display device 102, looks back at the display device 102, steps away, returns, or participates in any other actions dividing the attention of the viewer 114 and any action returning attention to the content stream 106.

Figure 2:
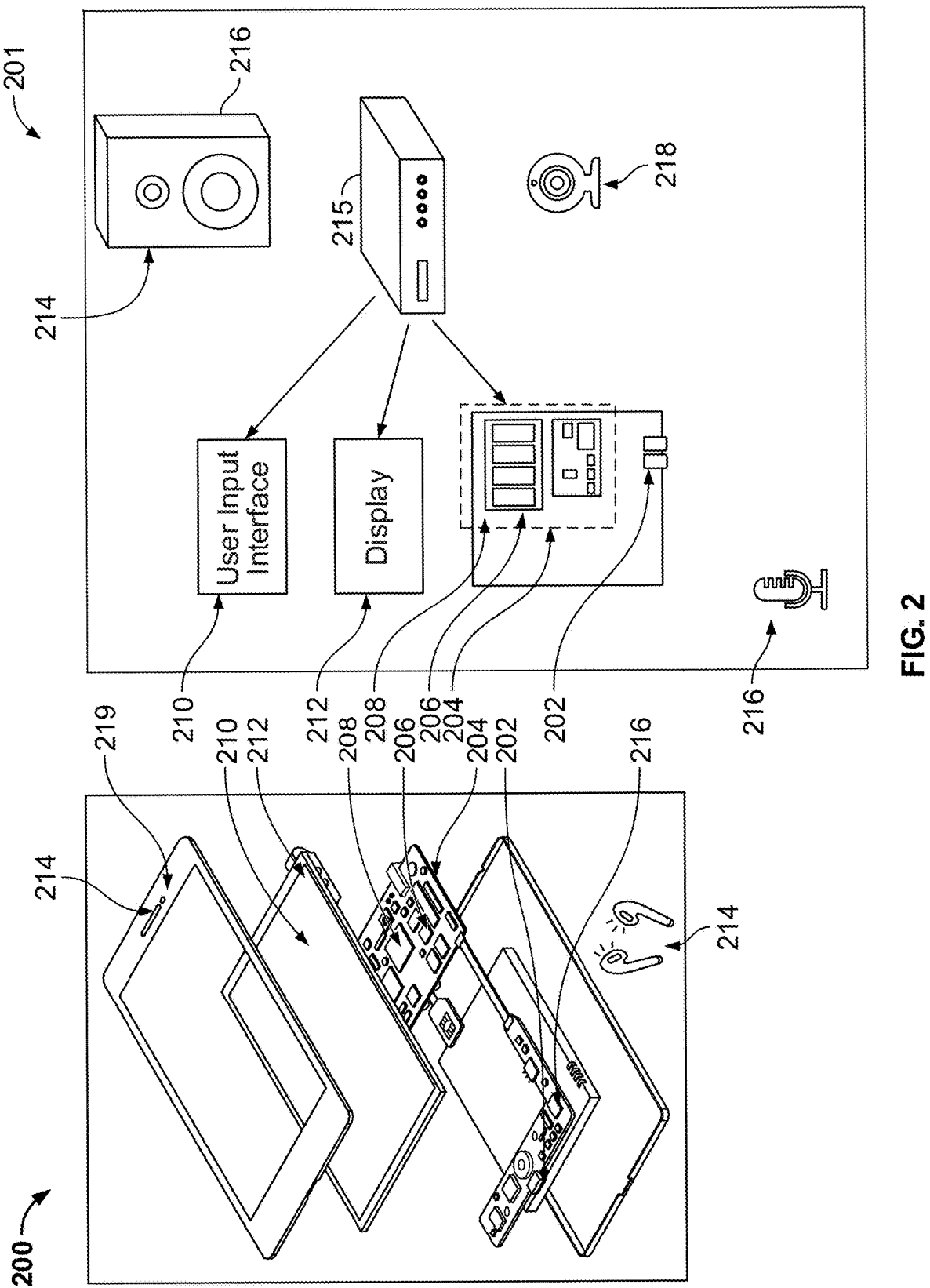
FIG. 2 shows an example architecture in accordance with some embodiments of the present disclosure.

FIG. 2 describes example devices, systems, servers, and related hardware for selectively playing content based on a detected attention level, in accordance with some embodiments of the present disclosure. FIG. 2 shows generalized embodiments of illustrative user equipment devices 200 and 201. For example, user equipment device 200 may be a smartphone device. In another example, user equipment system 201 may be a user television equipment system (e.g., user equipment 102 of FIG. 1). A system, such as content presentation system 100, may present content to a user, such as viewer 114, on user equipment system 201. At the same time the user equipment device 200 may also present content to a user, ultimately dividing the attention of the user. User television equipment system 201 may include set-top box 216. Set-top box 216 may be communicatively connected to microphone 218, speaker 214, and display 212. In some embodiments, microphone 218 may receive voice commands for a media application. In some embodiments, display 212 may be a television display or a computer display. In some embodiments, set-top box 216 may be communicatively connected to user input interface 210. In some embodiments, user input interface 210 may be a remote control device. Set-top box 216 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 2. Each one of user equipment device 200 and user equipment system 201 may receive content and data via input/output ("I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202, which may comprise I/O circuitry. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media application stored in memory (such as, storage 208). Specifically, control circuitry 204 may be instructed by the media application to perform the functions discussed above and below. In some implementations, any action performed by control circuitry 204 may be based on instructions received from the media application.

In client/server-based embodiments, control circuitry 204 may include communications circuitry suitable for communicating with a media application server or other networks or servers. The instructions for carrying out the above mentioned functionality may be stored on a server (which is described in more detail in connection with FIG. 2. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media application data described above. Nonvolatile memory may also be used (e.g., to launch a boot-up routine and other instructions). Cloud-based storage, described in relation to FIG. 2, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and down converting content into the preferred output format of user equipment 200. Circuitry 204 may also include digital-to-analog converter circuitry and analog-to-digital converter circuitry for converting between digital and analog signals. The tuning and encoding circuitry may be used by user equipment device 200, 201 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment device 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a display for a mobile device, or any other type of display. A video card or graphics card may generate the output to display 212. The video card may be any processing circuitry described above in relation to control circuitry 204. The video card may be integrated with the control circuitry 204. Speakers 214 may be provided as integrated with other elements of each one of user equipment device 200 and user equipment system 201 or may be stand-alone units. The audio component of videos and other content displayed on display 212 may be played through the speakers 214. In some embodiments, the audio may be distributed to a receiver (not shown), which processes and outputs the audio via speakers 214.

The system may run a media application that may be implemented using any suitable architecture. For example, it may be a stand-alone application wholly-implemented on each one of user equipment device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to rearrange the segments as discussed. Based on the processed instructions, control circuitry 204 may determine what action to perform when input is received from user input interface 210. For example, movement of a cursor on a display up/down may be indicated by the processed instructions when user input interface 210 indicates that an up/down button was selected.

In some embodiments, the media application is a client/server-based application. Data for use by a thick or thin client implemented on each one of user equipment device 200 and user equipment system 201 is retrieved on-demand by issuing requests to a server remote to each one of user equipment device 200 and user equipment system 201. In one example of a client/server-based guidance application, control circuitry 204 runs a web browser that interprets web pages provided by a remote server. For example, the remote server may store the instructions for the application in a storage device. The remote server may process the stored instructions using circuitry (e.g., control circuitry 204) to perform the operations discussed in connection with FIGS. 1 and 2-14.

In some embodiments, the media application may be downloaded and interpreted or otherwise run by an interpreter or virtual machine (run by control circuitry 204). In some embodiments, the media application may be encoded in the ETV Binary Interchange Format (EBIF), received by the control circuitry 204 as part of a suitable feed, and interpreted by a user agent running on control circuitry 204. For example, the media application may be an EBIF application. In some embodiments, the media application may be defined by a series of JAVA-based files that are received and run by a local virtual machine or other suitable middleware executed by control circuitry 204. In some of such embodiments (e.g., those embodiments employing MPEG-2 or other digital media encoding schemes), the media application may be, for example, encoded and transmitted in an MPEG-2 object carousel with the MPEG audio and video packets of a program.

FIG. 3 illustrates a process 300 of the content presentation system 100 in rendering, for example, sounds of FIG. 1. The process begins with attention tracking at 301. There, the content presentation system 100 monitors, using data from sensors, an attention level of a viewer such as, viewer 114 of FIG. 1. As discussed above, a sensor may be any sensor capable of receiving interaction data. For example, the sensor may be a camera coupled with facial recognition software, which can detect if a face of a viewer is directed at the display of, for example, the display device 102 or 201 of FIGS. 1 and 2, and thereby, the content stream such as, content stream 106 of FIG. 1. In some embodiments, the sensor collects data regarding how often and to what degree a viewer enters input. Such detected input may include any user input, for example, content selection, volume control, adjusting caption settings, and pausing, among others. These embodiments may take the form of monitoring a viewer controlled tracker over a period of time. In some embodiments, attention tracking 301 is continuous during the presentation of content, for example, the content stream 106 of FIG. 1.

If the content presentation system 100 determines that the attention level of the viewer is below a threshold, the workflow continues to video scene understanding at 302. Video scene understanding uses computer vision, similar software, or metadata to identify objects and events in a scene of content, for example, content stream 106 of FIG. 1. In some embodiments, the analysis of the scene is in response to a detected criteria, such as an attention level below a threshold, and if the criteria is not met, the content presentation system 100 will not begin video scene understanding. In some embodiments, the analysis of the scene is during a detected attention level, that is, the content presentation system 100 performs video scene understanding so long as an attention level criteria is met. In some embodiments, the analysis of the scene is based on metadata of the scene or content. In some embodiments, the content presentation system 100, either solely or in addition to added sounds, for example, sounds of FIG. 1, may provide a description of the scene as understood by video scene understanding 302.

The content presentation system 100 then determines sounds typically associated with the objects and events. For example, if the content presentation system 100 identifies a dog in a scene, it might recognize that barking or panting sounds are typical. In another example, if the content presentation system 100 recognizes that a character leaves a room in a scene, it might recognize that sounds of footsteps or doors opening and closing are typical. At sound object management 303, the content presentation system 100, using sound object management software, indexes these sounds based on type and location in the scene. For example, the content presentation system 100 may index animal sounds into one group. It might similarly index sounds stemming from the foreground and background separately, as they will come from different locations in the scene.

The content presentation system, then at 304, performs sound synthesis, using sound object rendering software, in which it generates sounds associated with the objects and events of the content, for example, content stream 106 of FIG. 1. Sound generation may be by sound synthesis software or by obtaining prerecorded files. If real-time sound synthesis is required, the content presentation system 100 may use techniques from digital signal processing (DSP) and GenAI, such as the AudioCLTP model, to create the sound dynamically.

At 305, the content presentation system 100 renders the generated sounds. Depending on the attention level determined at 301, the content presentation system 100 may render some or all of the sound objects associated with the current scene as additional sound effects so that a viewer can hear them even if not paying attention to the display device or content stream.

The content presentation system 100 selects additional sound objects and sounds based on information about the content stream 106 that it obtains via video scene understanding. Video scene understanding is a field within computer vision and artificial intelligence focused on interpreting and analyzing the content of video sequences. It involves extracting meaningful information from video data to understand what is happening within a scene. Video scene understanding may include identifying objects using image recognition, identifying actions and events though changes among a series of frames, as well as understanding the spatial and temporal relationships between elements of a scene. This technology has been widely used in areas such as surveillance, autonomous driving, sports analytics, AR, and others. For example, Google's ARCore provides APIs for video scene understanding.

Figure 4:
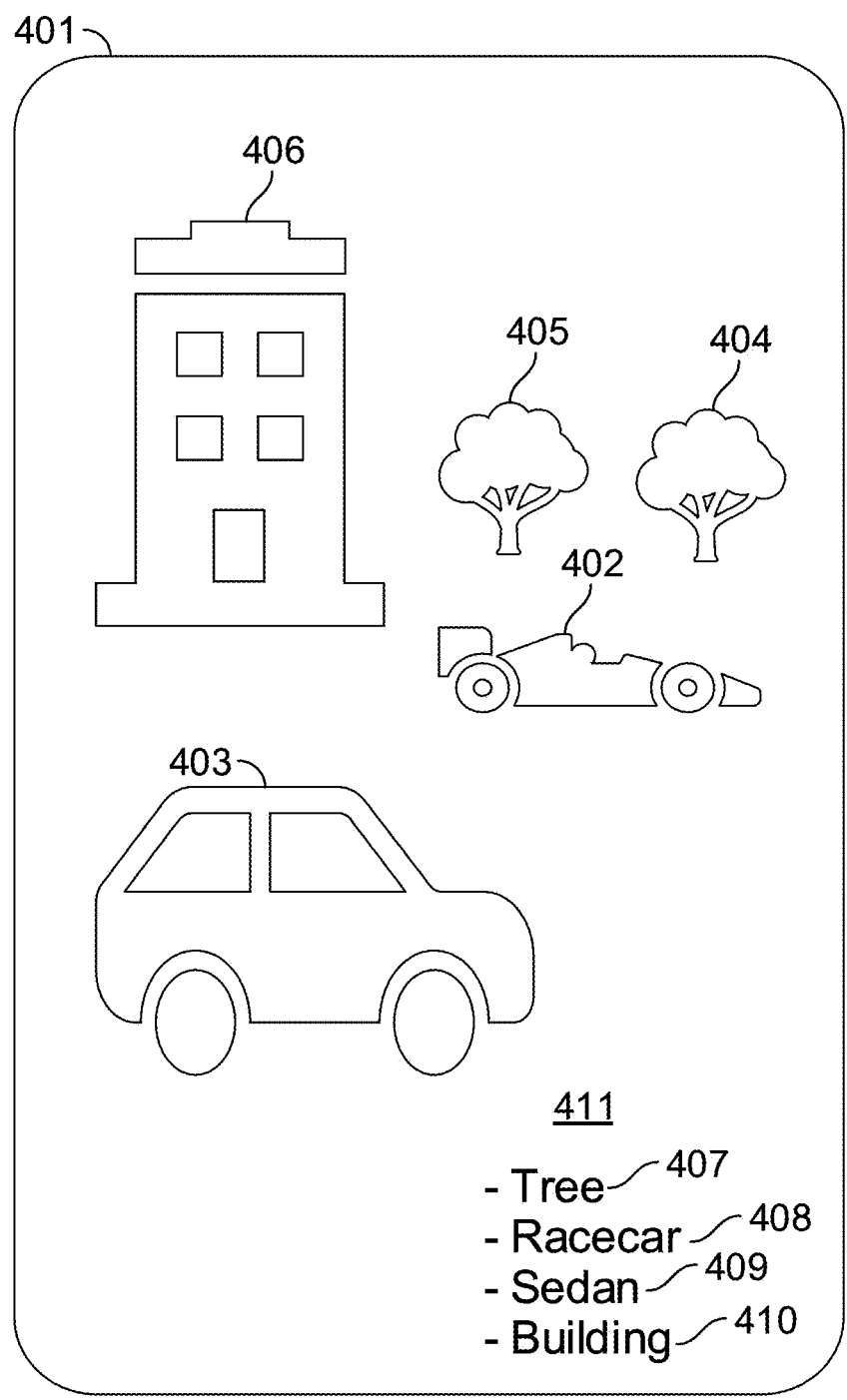
FIG. 4 shows an example result of video scene understanding in accordance with some embodiments of the present disclosure.

FIG. 4 shows an example of video scene understanding. In the scene 401 of FIG. 4, there is a racecar 402, a sedan 403, two trees 404, 405, and a building 406. In FIG. 4, a machine, such as a processor, runs a video scene understanding algorithm to analyze scene 401. The lower right corner of the FIG. 4 shows a list 406 of objects 407-410 identified using the algorithm, including a racecar 408, a sedan 409, tree 407, and a building 410. The algorithm has identified these objects from the image using the images of the scene 401, and it then uses or transmits this information as appropriate for additional analysis.

Figure 5:
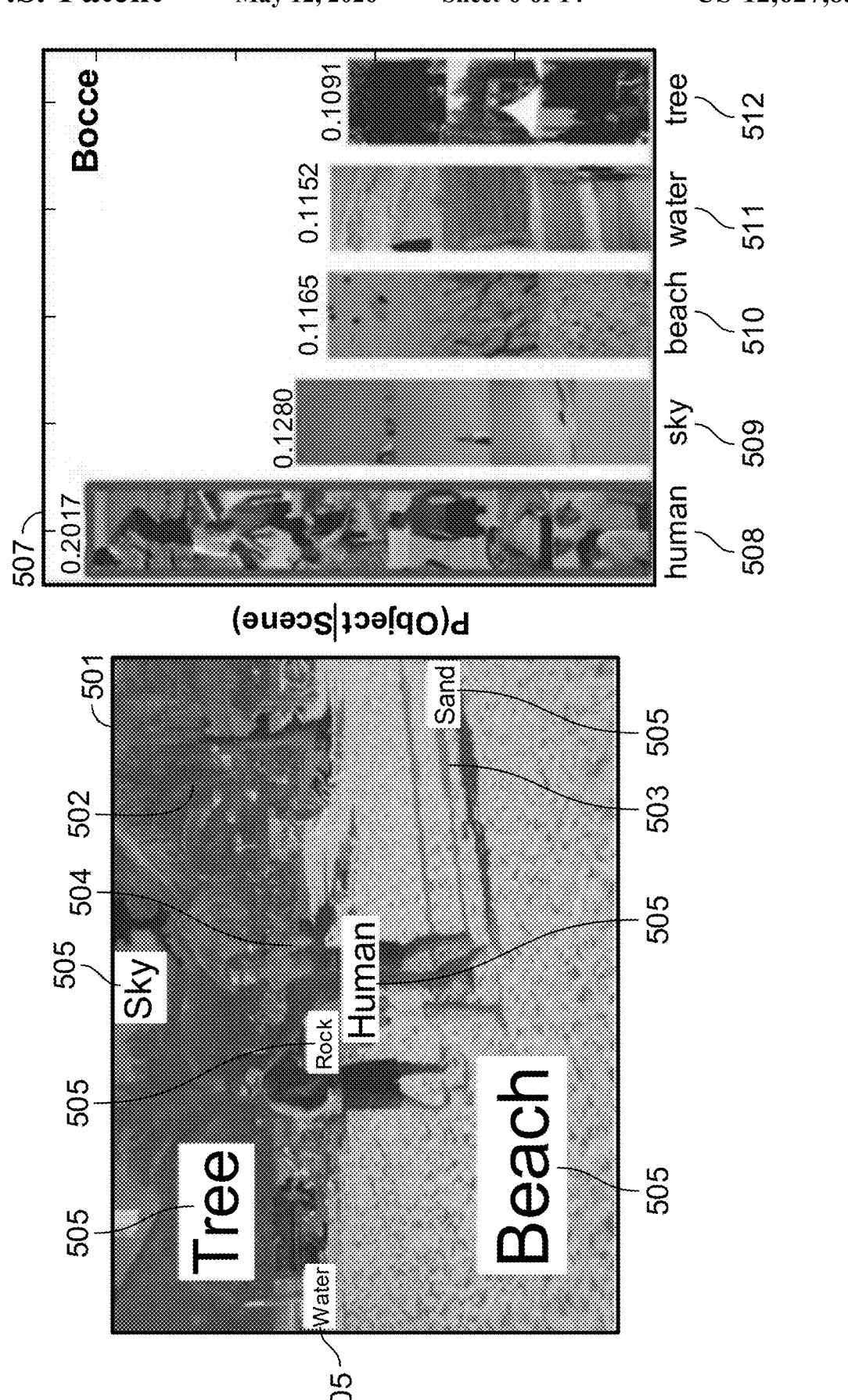
FIG. 5 shows an example result of video scene understanding in accordance with some embodiments of the present disclosure.

FIG. 5 shows a second example of video scene understanding. In the image 501 of FIG. 5 are, for example, trees 502, sand 503, and people 504. FIG. 5 shows these elements labeled with descriptors 505 as a result of video scene understanding analyzing image 501. In some embodiments the video scene understanding also organizes the detected objects, seen in mapping 507, for further information extraction, such as event identification. Mapping 507 graphs objects human 508, sky 509, beach 510, water 511, and tree 512 according to frequency. Using this data, the video scene understanding extrapolates, via video analysis software, additional information as required by an application.

The content presentation system 100 also uses video scene understanding to recognize objects and events that create sounds or that are helpful to understand the context of the content item.

Once the content presentation system 100 recognizes an object from a scene, the content presentation system 100 can map the object to a corresponding sound. In some embodiments, the content presentation system 100 includes a predefined database or algorithm that associates specific objects with certain sounds to facilitate the mapping. For example, a dog could be mapped to a barking sound, and a car can be mapped to an engine sound. Once a corresponding sound is identified, the content presentation system 100 generates the sound or retrieves it from a library of pre-recorded sounds.

Figure 6:
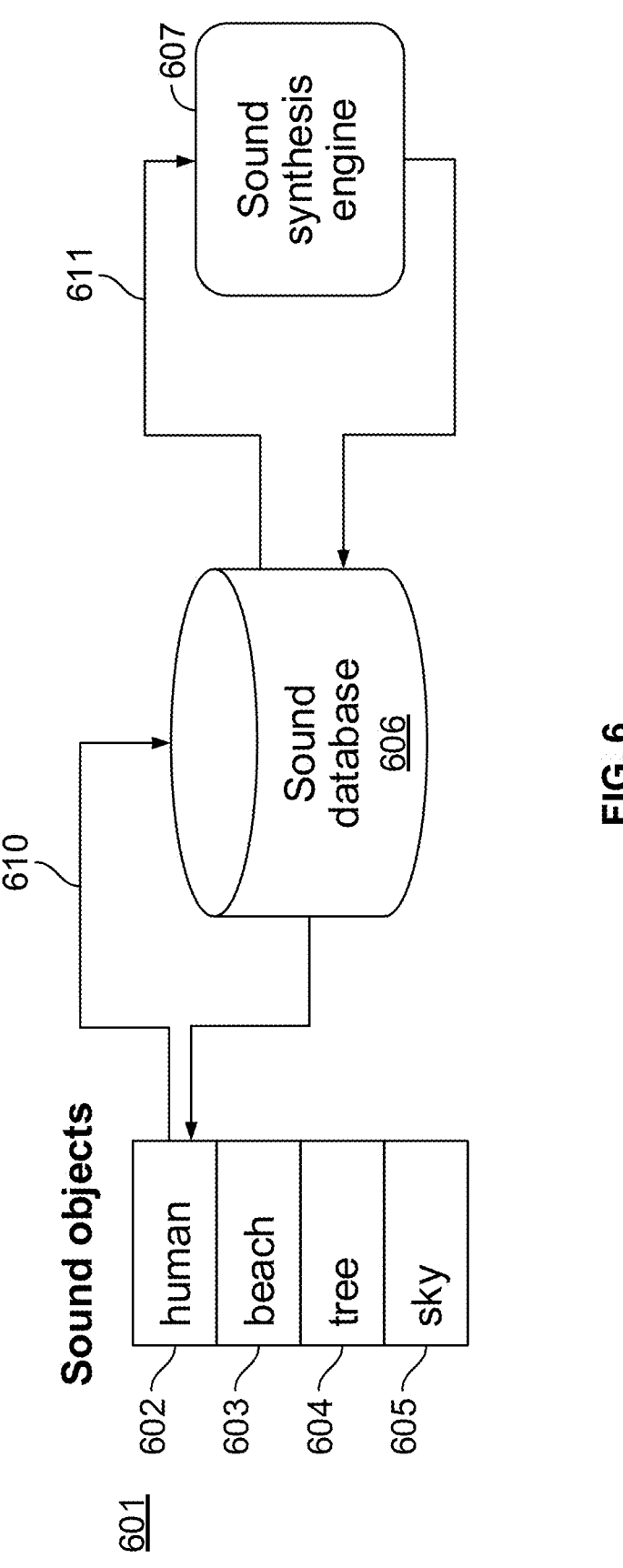
FIG. 6 shows an example process of sound generation in accordance with some embodiments of the present disclosure.

If the content item necessitates real-time sound synthesis, the content presentation system 100 may use techniques from digital signal processing (DSP) and GenAI to create the sound dynamically. One example of such technology is the AudioCLIP model. Such a process is shown in FIG. 6. Block 601 shows identified objects, or sound objects, human 602, beach 603, tree 604, and sky 605, as identified in FIG. 5. The content presentation system 100 then maps the identified objects to sounds and searches a sound database 606 for matching sounds. For example, the human object 602 might be mapped to the sound of footsteps, the beach object 603 may match to wave sounds, the tree object 604 may map to the sound of rustling leaves, and the sky 605 may map to wind sounds. The content presentation system 100 then searches the sound database, as shown by arrow 610, for the associated sound, such as the sound of footsteps. If a sound is not in the sound database, the content presentation system 100 may then move to a sound synthesis engine 607 as shown in arrow 611. The sound synthesis engine 607 may then generate a sound file, for example, using generative artificial intelligence. Once the sound synthesis engine 607 generates a sound file, it may store the sound file in the sound database 606 for use. Once the content presentation system 100 retrieves a sound, the content presentation system 100 may match these sounds to objects for presentation.

In some embodiments, the additional sounds complement the scene and do not distract from its events. For example, the sounds may reflect events in the content stream but not obscure original audio. As a result, the content presentation system 100 will not, in some embodiments, include additional conversations or speech as such sounds often detract from existing plot lines.

In some embodiments, the content presentation system 100 excludes sounds similar to sounds that are already included in the content item. For example, if the content item already has ocean wave sounds, then the sound object of ocean waves could be optionally filtered out.

Figure 7:
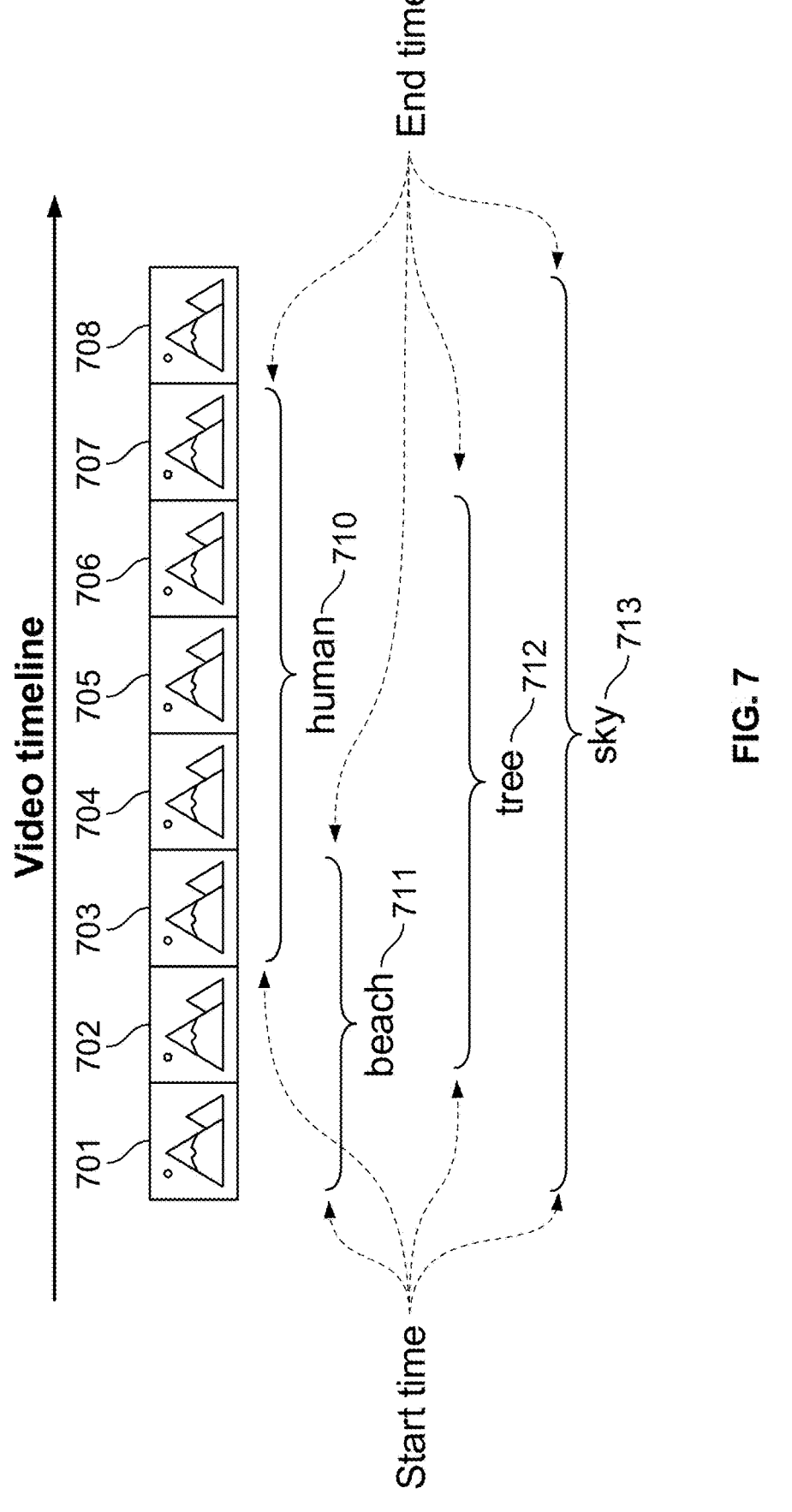
FIG. 7 shows example timing of sound objects in accordance with some embodiments of the present disclosure.

Once the content presentation system 100 recognizes the sound objects, it annotates their presence in the content stream 106 with start time and end time. Each sound object can overlap timing with any other sound objects. Some sound objects can disappear and reappear at any time. FIG. 7 illustrates timing and overlap of four example sound objects, sound objects associated with a human 710, a beach 711, a tree 712, and the sky 713. Frames 701-708 represent the video timeline of a content item. The human sound object 710 begins between frames 702 and 703 and ends between frames 707 and 708. The beach sound object 711 begins at frame 701 and ends after frame 703. The tree sound object 712 begins between frames 701 and 702 and ends between frames 706 and 707. The sky sound object 713 begins at frame 701 and ends after frame 708. As seen in FIG. 7, all sound objects play at frame 703 and only the sky sound object 713 plays at frame 708. In this example, sounds associated with these sound objects may also overlap at times. It should be noted however that object recognition and other analysis need not be frame by frame and that other approaches may also suffice.

In some embodiments, the volume or prevalence of a sound is also variable. In such embodiments the volume of a sound 108 is based on an attention weight that inversely reflects a detected attention level of a viewer such as, viewer 114 of FIG. 1. For example, if content presentation system 100 detects full attention, it might weight additional sound objects with a low weight. The low weight may then cause the content presentation system 100 to present the sound objects at a low or nonexistent volume level. On the other hand, if the content presentation system 100 detects low attention, it might weight an additional sound object heavily, causing prominent presentation.

Figure 8:
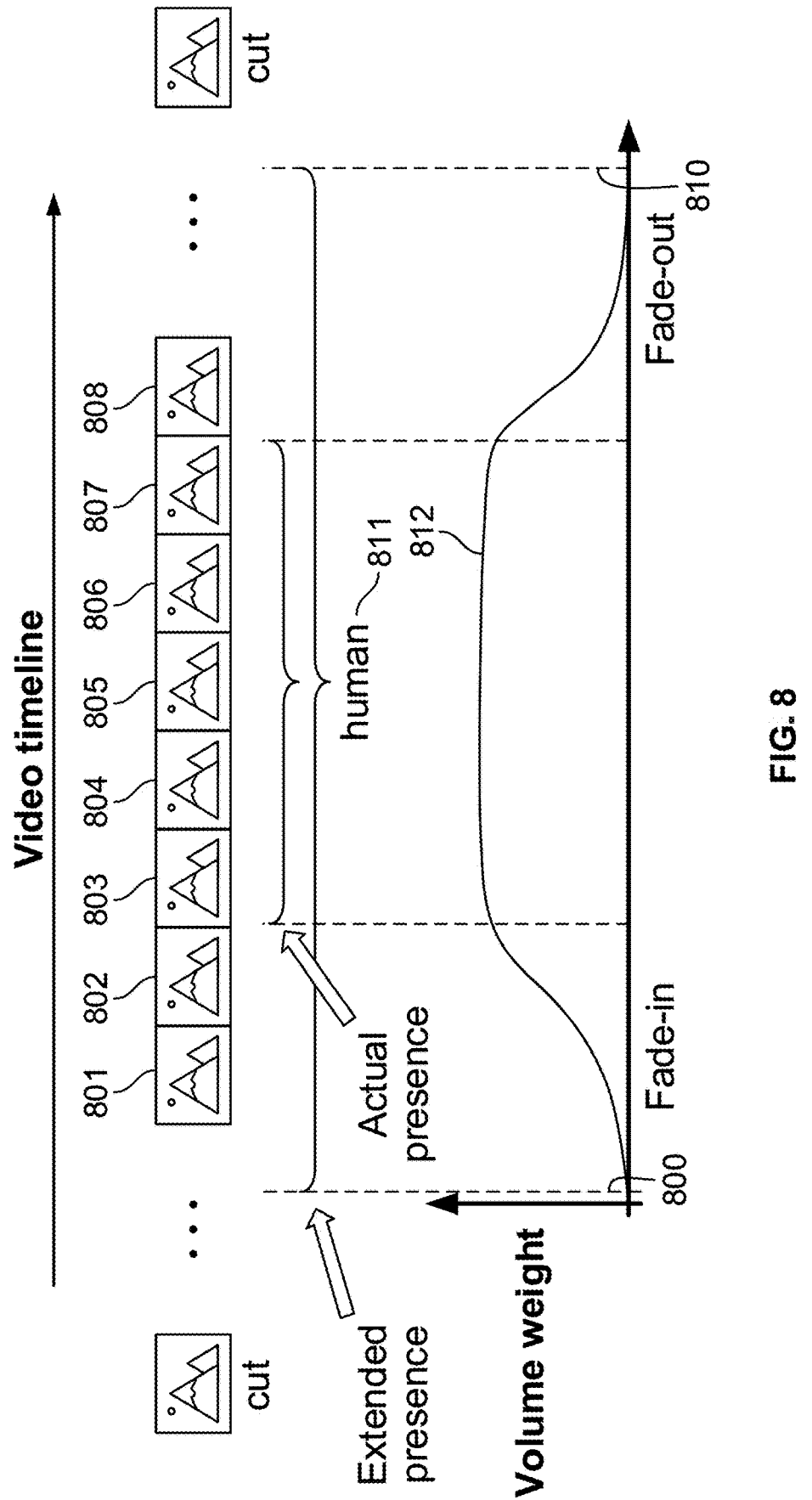
FIG. 8 shows example timing of additional sounds relative to a sound object in accordance with some embodiments of the present disclosure.

In the real world, if the sound object, that is, a sound associated with an object, is within the same continuous scene, even if the object creating the sound is not in view, the sound object should still be heard, although in some cases, less audibly. Therefore, in some embodiments sounds, for example, sounds of FIG. 1, associated with sound objects are extended beyond the points at which the sound objects creating the sounds are visible. In some embodiments the sounds vary in volume during presentation. For example, a sound may fade in and out. FIG. 8 shows an example timeline of a human sound object 811 and its corresponding sounds 812, represented by a line. The source of the sound, human object 811, is in view in frames 803-807. The extended presence of the human object 811, that is, the time at which the object is present but not visible, reaches from frames at time point 800 to timepoint 810. To address the extended presence of human object 811, the sound management of content presentation system 100 begins presenting the sounds 812 at timepoint 800 but at a low volume. The volume increases so as to fade in the sound until the content item reaches human object 811 in view at frame 803. At frame 807, when the human object leaves the view of the content item, the sound management again adjusts the volume of the sound object to fade out the sound until timepoint 810. The fade-in and -out effects create a natural transition that mimics the real-world perception of sounds, in which listeners may hear an object immediately before and after seeing it.

A similar process may also provide information or clarification for an object in the content, for example, content stream 106 of FIG. 1, that is obscured. For example, in the jungle scene of FIG. 1, there might be a jaguar hiding in the grass. The jaguar would be difficult for a viewer, such as viewer 114 of FIG. 1, to notice. Content presentation system 100 may, through video scene understanding 302, discover the jaguar and present sounds, such as rustling grass and a jaguar roar, to emphasize the presence of the jaguar. In some embodiments, the content presentation system 100 may alter these sounds to reflect their position in the scene, providing clues about the location of the jaguar. For example, the content presentation system 100 may position the sound to create an impression that the sound is coming from the left or right, depending on the location of the jaguar.

In some embodiments, the properties of sound objects can also impact the presentation of additional sounds. For example, the volume of a sound may vary to reflect a distance or focus of an object relative to the screen. In some embodiments, the content presentation system 100 adjusts the number of objects based on an attention level. For example, a lower attention level may require more objects to convey a setting. That is, the content presentation system 100, may produce sounds associated with more objects and events in a scene to convey more information when it detects a low attention level. At a middle attention level, on the other hand, the content presentation system 100, may choose to present sound objects associated with only peripheral objects as a viewer is likely to follow the main objects when watching at a middle attention level. To accomplish this feature, the content presentation system 100 may organize the sound objects or sounds based on type or 2D or 3D location in a frame. For example, at a low attention level, the content presentation system 100 may present sound objects from an entire scene, but at a middle attention level, may only present sounds associated with objects from the far left and right of the scene as those objects are most likely to lack prominent presentation.

Figures 9A, 9B, 9C:
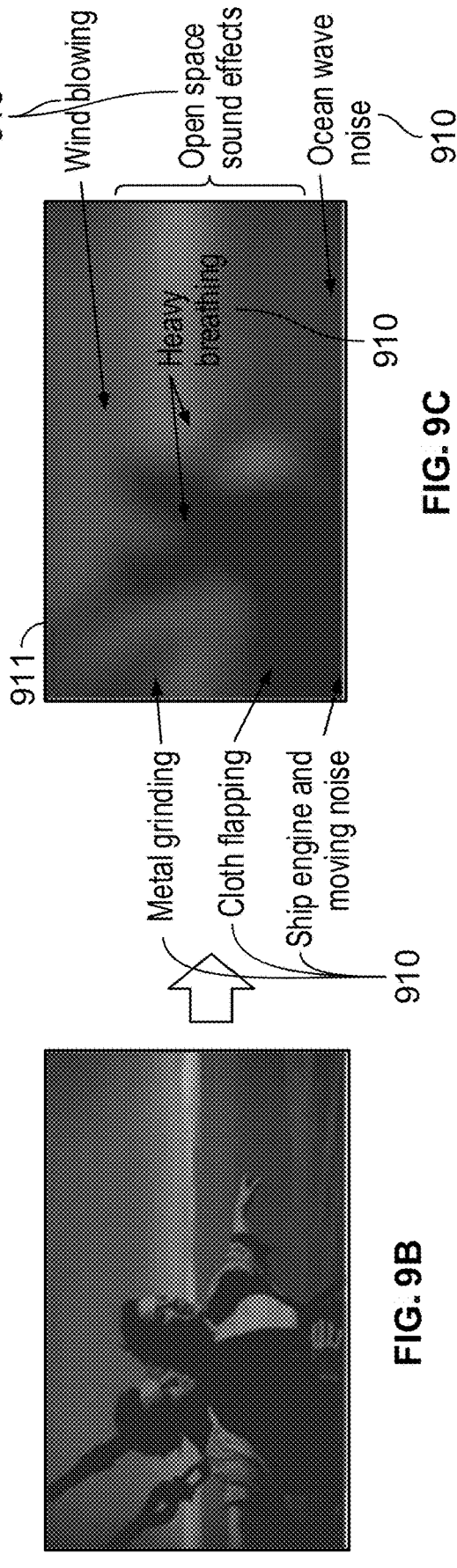
FIG. 9A shows an example scene with sound objects identified in accordance with some embodiments of the present disclosure.
FIG. 9B shows an example original scene in accordance with some embodiments of the present disclosure.
FIG. 9C shows an example augmented scene in accordance with some embodiments of the present disclosure.

FIG. 9A shows another example embodiment of the content presentation system 100. In FIG. 9A is a movie scene portraying two characters on a ship. Various sound objects may be related to the scene. For example, the metal chain may create a clanging, grinding sound, wind may create a whoosh or blowing sound, the characters may create breathing sounds, the ocean may create wave sounds, clothing may create a flapping sound, etc. Also, the spatial audio elements and the locations of each sound object, such as semantics, can also be estimated. For example, FIG. 9A takes place over the ocean, which is predominately open space. The content presentation system 100 may then generate open space sound effects or reverberations. The content presentation system 100 can apply these spatial sound effects to other sound objects to create a more realistic and engaging audio experience. In some embodiments, the content presentation system 100 creates sound objects that could be generated instantaneously during presentation of the content stream or pre-generated as part of the video production.

FIGS. 9B and 9C show the content stream of FIG. 9A before and after content presentation system 100 detects a low attention level. Initially, in FIG. 9B, is the original content stream. The original content stream has no additional sound and it shows a clear image. The content presentation system 100 presents a content stream as seen FIG. 9B when the attention level is above a threshold. In FIG. 9C, the content presentation system 100 detects an attention level below a threshold. It then adds sound objects 910, the sounds identified in FIG. 9A. It also may reduce the quality of the visual component of the content stream resulting in a blurry image 911. If the content presentation system 100 detects that an attention level has risen above the threshold, the content presentation system 100 will return the content stream to the state seen in FIG. 9B.

An example mapping of attention weight over time is shown in FIG. 10. FIG. 10 shows a graph with attention weight at the Y-axis and time on the X-axis. At timepoint 1010, the content presentation system 100 tracks the attention of a viewer during a content item stream. At timepoints 1010-1040, the content presentation system 100 detects partial attention. Based on this detected attention level, the content presentation system 100 applies an attention weight of 0.5 to present additional sound objects at a moderate prevalence. At timepoint 1020, the content presentation system 100 detects full attention. This determination means that the content presentation system 100 has no need for any additional sound objects, thus the attention weight applied to all sound objects should be zero. At a zero weight, the additional sound objects are not detectable and the content presentation system 100 presents an unaltered version the content item stream. The content presentation system 100 then, in response the detection, gradually transitions the additional sound objects to have an attention weight of zero, at which point they are undetectable, creating a smooth transition. The content presentation system 100 continues to monitor attention level and at timepoint 1030 detects no attention to the content item stream, e.g., the viewer is not looking at the content item stream at all. If the viewer is not looking at the content item, the sound objects should be prevalent to provide additional context. Based on this determination, the content presentation system 100 changes the attention weight of the additional sound objects gradually again, this time to be 1.0, making them the most prevalent.

In some embodiments, multiple viewers watch a content item stream. For example, a family or group of friends may watch a movie together in front of a television. In such embodiments, the content presentation system 100 may separately track the attention levels of one or multiple viewers. For example, the content presentation system 100 may track only a primary representative viewer. In another embodiment, the content presentation system 100 may consider an average attention level of all or a selection of viewers. The content presentation system 100 may in some embodiments use facial recognition algorithms to identify distinct viewers and use this data to track the attention level of the viewers. In some embodiments, each individual viewer may be associated with a specific sensor. In some embodiments, the content presentation system will add additional sounds, for example, sounds of FIG. 1, via process 300 if all of the tracked viewers are below a designated attention threshold level. In some embodiments, the content presentation system will add additional sounds via process 300 if the content presentation system 100 detects that at least one of the tracked attention levels of the viewers is below a designated attention threshold level. In such an embodiment, the content presentation system 100 may not necessarily need to track individual viewers but rather may begin process 300 upon identifying one indicator of low attention. In some embodiments, involving multiple users, the content presentation system 100 generates additional sounds at a low volume to not disturb some viewers.

In some embodiments, the content presentation system 100 adjusts the bitrate of the content item stream according to the attention level. For example, if the content presentation system 100 determines, based on sensor data, that the attention level of a viewer, such as, viewer 114 of FIG. 1, is below a threshold, the content presentation system may reduce the bandwidth of the content stream. While reducing the bandwidth of the content stream will reduce the visual quality, and potentially the visibility, of the content item stream, the change in quality is unlikely to impact viewer experience if the viewer is not closely watching the content stream, that is, when the content presentation system 100 detects a low attention level. At the time of reduced bitrate, the content presentation system 100 detects that the viewer is not watching the visual component of the content item stream and therefore is unlikely to notice any change in quality. Still, the reduced bitrate will save bandwidth and data, improving resource allocation. Similarly, if the content presentation system 100 detects that the viewer returns his or her gaze to the visual component of the content item, the content presentation system 100 may increase the bitrate to ensure that the viewer experiences a high quality visual stream. Although increasing the bitrate will create a heavier load on the content presentation system 100, it will improve user experience.

The content presentation system 100 may also personalize output to serve a goal in some embodiments. For example, the content presentation system 100 may tailor output to that most likely to maximize engagement from the viewer regardless of attention level. In such embodiments, the content presentation system 100 may track engagement from the viewer separate from attention level. For example, the content presentation system 100 may present a clickable prompt at a given interval and record a percentage of prompts engaged as an indicator of overall engagement. In another embodiment, the content presentation system 100 may interpret audio and/or language near the display device to estimate engagement level. For example, a cheer during a team win may indicate engagement, while conversation during a suspenseful moment may indicate limited engagement. In such embodiments, the content presentation system 100 may, for example, increase the number of additional sounds added to improve engagement with the content item stream.

In another embodiment, the content presentation system 100 may tailor output to that most likely to maximize a time that a viewer watches the screen of the display device. In some embodiments, the content presentation system 100 achieves this goal through additional sound objects that pique the curiosity of a viewer. For example, the content presentation 100 may add music to mirror a feeling.

In another embodiment, the content presentation system 100 may tailor output to that most likely to minimize the time that a viewer watches the screen of the display device. Such embodiments may be favorable to preserve bandwidth and other resources, for example. For example, a viewer may watch an event with little visual information, such as the presidential debate. Because there is little visual information, the content presentation system 100 may remove or reduce the quality of the visual component and compensate with adding additional sound objects. Removing or reducing the quality of a component opens up bandwidth for other devices or processes.

In some embodiments, the content presentation system 100 may detect attention levels at portions of the screen of the display device. For example, the content presentation system 100 may detect that the attention of a viewer is focused on the left side of the screen and may, based on that information, determine that the viewer is likely to miss information visually represented on the right side of the screen. Based on information indicating that the viewer is focusing on only a portion of the screen, or is likely to miss information in a portion of the screen, the content presentation system 100 may selectively play or emphasize additional sound objects related to objects or events from the unwatched portion.

FIG. 11 shows a graphical representation of the attention weight of sound objects—based on an attention of a viewer (e.g., viewer 114 of FIG. 1)—on the screen area of a display device. The Y-axis of the graph of FIG. 11 is attention weight with a representation of the screen area on the X-axis. The graph shows that the attention weight of sound objects associated with the center of the screen 1101, where the content presentation system 100 had detected full attention is 0. This weight reflects the fact that additional sounds related to this area are unlikely to add additional value. The attention weight at the edges of the screen 1102 and 1104, however, is 1.0, and the attention weight gradually increases from the center 1101 to the edges 1102 and 1104. These changes in weight reflect the growing need for supplemented information as details move farther from the center of the screen.

Figure 12:
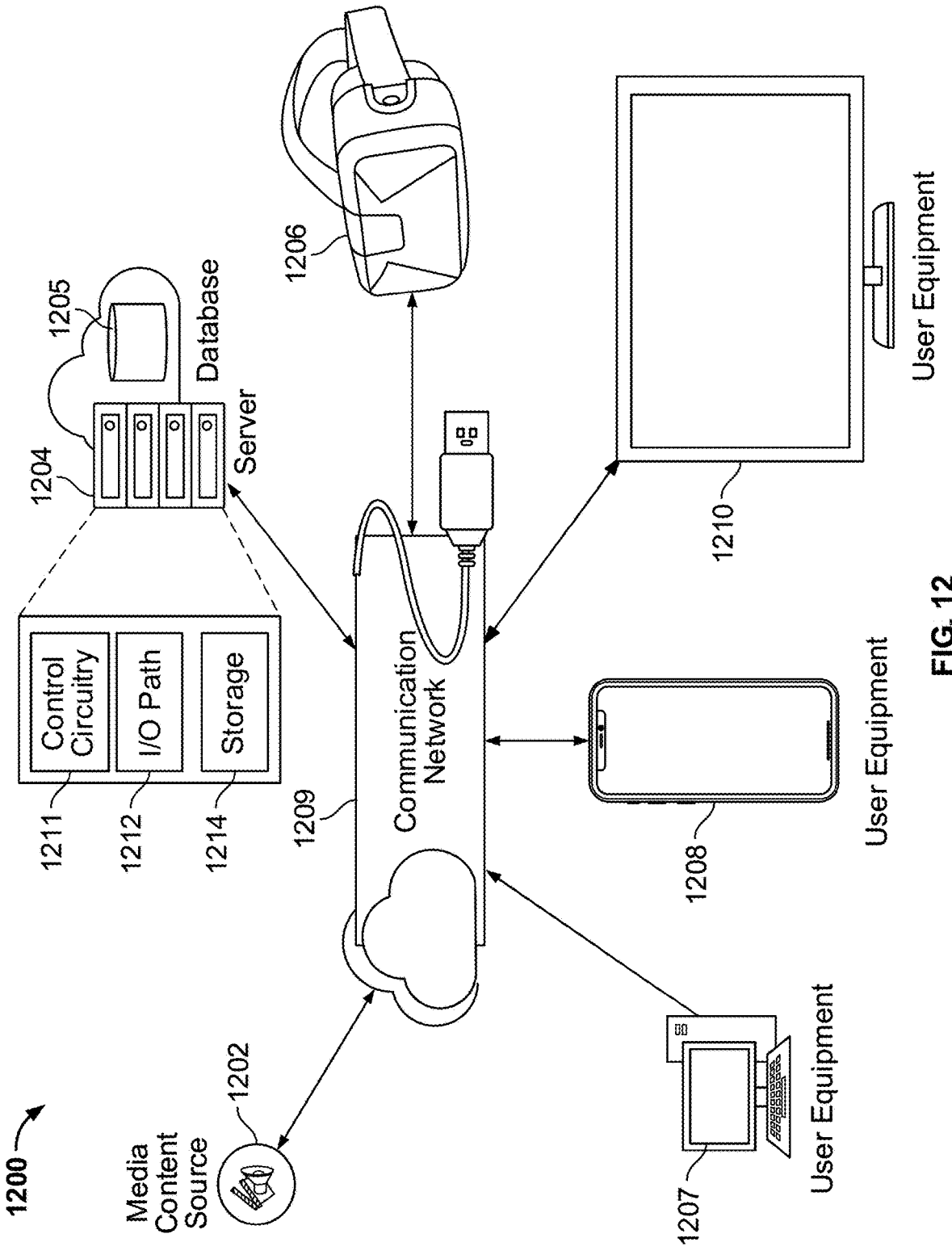
FIG. 12 shows a diagram of an illustrative content system, in accordance with some embodiments of the disclosure.

FIG. 12 is a diagram of an illustrative content system, in accordance with some embodiments of the disclosure. User equipment devices 1207, 1208, 1210 (e.g., user equipment device 200, 201) may be coupled to communication network 1209. Communication network 1209 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 1209) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 12 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1209.

System 1200 includes a media content source 1202 and a server 1204, which may comprise or be associated with database 1205. Communications with media content source 1202 and server 1204 may be exchanged over one or more communications paths but are shown as a single path in FIG. 12 to avoid overcomplicating the drawing. In addition, there may be more than one of each of media content source 1202 and server 1204, but only one of each is shown in FIG. 12 to avoid overcomplicating the drawing. If desired, media content source 1202 and server 1204 may be integrated as one source device.

In some embodiments, server 1204 may include control circuitry 1211 and a storage 1214 (e.g., RAM, ROM, Hard Disk, Removable Disk, etc.). Server 1204 may also include an input/output path 1212. I/O path 1212 may provide device information, or other data, over a local area network (LAN) or wide area network (WAN), and/or other content and data to the control circuitry 1211, which includes processing circuitry, and storage 1214. The control circuitry 1211 may be used to send and receive commands, requests, and other suitable data using I/O path 1212, which may comprise I/O circuitry. I/O path 1212 may connect control circuitry 1204 (and specifically processing circuitry) to one or more communications paths.

Control circuitry 1211 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1211 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 1211 executes instructions for an emulation system application stored in memory (e.g., the storage 1214). Memory may be an electronic storage device provided as storage 1214 that is part of control circuitry 1211.

Figure 13:
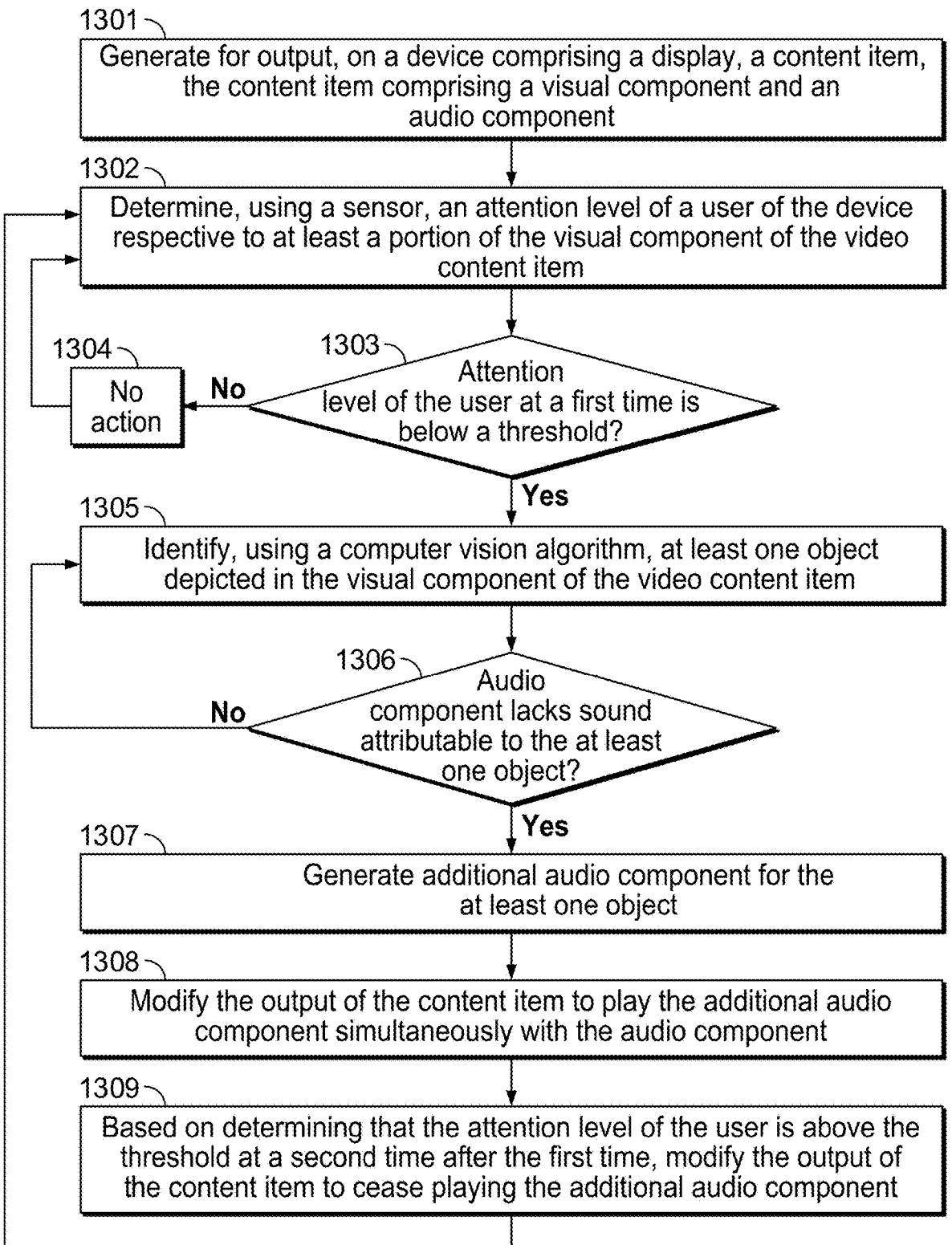
FIG. 13 shows an example process in accordance with some embodiments of the present disclosure.

Server 1204 may retrieve guidance data from media content source 1202, process the data as will be described in detail below, and forward the data to user equipment devices 1207 and 1210. Media content source 1202 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 1202 may be the originator of content (e.g., a television broadcaster, a Webcast provider, etc.) or may not be the originator of content (e.g., an on-demand content provider, an Internet provider of content of broadcast programs for downloading, etc.). Media content source 1202 may include cable sources, satellite providers, on-demand providers, Internet providers, over-the-top content providers, or other providers of content. Media content source 1202 may also include a remote media server used to store different types of content (including video content selected by a user), FIG. 13 shows an example flowchart of a system (e.g., content presentation system 100 of FIG. 1). At step 1301, the content presentation system 100 generates for output, on a device comprising a display a video content item, the video content item comprising a visual component and an audio component. The content presentation system 100 may use, for example, I/O path 1212 of FIG. 12 to generate output. Content presentation system 100 may further generate content for output on a display such as, display device 102. The video content item may be, for example, content stream 106 of FIG. 1, At step 1302, the content presentation system 100 determines via a processor, for example processing circuitry 206, of FIG. 2, using data collected from a sensor, an attention level of a user of the device, such as, viewer 114 of FIG. 1, respective to at least a portion of the visual component of the video content item, such as, content stream 106 of FIG. 1. In some embodiments, the determined attention level applies to the content item as a whole. In some embodiments, the attention level relates to one or more regions of the content item.

At step 1303, the content presentation system 100 determines using a processor such as, processing circuitry 1206 of FIG. 12, whether the attention level is below a threshold. An attention level below a threshold represents that the user is not giving full attention to the video content item. An attention level above a threshold represents that the user is giving enough attention to likely recognize visual details in the video content item. In some embodiments, an external source, such as a user setting, provides the threshold. In some embodiments, the content presentation system 100 calculates the threshold based on a number of factors. If the attention level is at or above the threshold, the content presentation system 100 performs no action at 1304 and continues to generate the content item as before, as the user likely does not need supplement sounds. It may then return to step 1302 to continually monitor an attention level of a user.

If the content presentation system 100 determines that the attention level is below a threshold, it identifies, at 1305, using a computer vision algorithm, at least one object depicted in the visual component of the video content item. In some embodiments, the content presentation system 100 identifies as the at least one object of importance to the context or storyline of the video content item. In some embodiments, the identification is by video scene understanding software. For example, the content presentation system 100 may identify a person entering a scene, or a significant object like a weapon. While these pieces of information may have no sound in the original audio of the video content item, they are likely important developments to the concepts of the video content item.

At 1306, the content presentation system 100 determines, using a processor, if the audio component of the content item lacks sound attributable to the at least one object. In some embodiments, this determination uses sound analysis software that analyzes the default audio of the content item. For example, using the illustration above of a person entering a room, the content presentation system 100 may determine that sound indicators, such as footsteps or a voice, are already present in the audio component of the video content item. In that situation, additional sound is likely unnecessary. If the content presentation system 100 determines that appropriate attributable sound is already present, the content presentation system 100 may identify a second object for which to attribute sound. If satisfied, it may also end the process until the content item presentation 100 reaches a new scene or object for which the user is not giving full attention.

If the content presentation system 100 determines that the audio component lacks attributable sound, it moves to step 1307, at which it generates additional audio related to the at least one object. The content presentation system 100 may generate sound through a database of stored and labeled sounds or through sound generation software.

The content presentation system 100 next moves to step 1308 at which it modifies the content item to play the additional audio component simultaneously with the audio component of the video content item. If the content presentation system 100 then determines that the attention level of the user is above the threshold at a later time after the first time, it again modifies the output of the content item to cease playing the additional audio component at 1309. The content presentation system 100 then returns to 1302 to continue to monitor the attention level of the user.

It should be noted that the content presentation system 100 may perform the steps of FIG. 13 in some embodiment in an order different than that described above. For example, the content presentation system 100 may in some embodiments identify objects in the visual component of the video content item before presenting a content item for output or determining an attention level of a user. Similarly, the content presentation system 100 may also determine that audio output lacks sound attributable to certain objects before presenting a content item for output or determining an attention level of a user. The content presentation system 100 may also continually monitor an attention level such that it at any point during the process described in FIG. 13 returns to step 1302.

It should also be noted that the content presentation system 100 may perform many of the steps of the process described in FIG. 13, such as presenting a content item for output, determining an attention level of a user, and identifying an object in the visual component of the content item, independently and/or concurrently.

In some embodiments, the content presentation system 100 may suppress background sound in the original audio of the content stream. In some embodiments, the content presentation system selectively suppresses particular sounds, based on, for example, the importance or value of the sound. In some embodiments, the content presentation system 100 may select sound to suppress based on available metadata or analysis of a sound profile, where a sound profile is data available or extracted regarding a specific sound. For example, metadata of a content stream may identify various sounds, such as music and sound effects. The metadata may also include sound profiles of these sounds, or sound analysis software may determine sound profiles using audio analysis. In some embodiments, the sound profiles may include information identifying a purpose of the sound, such as a background sound, sound effects, or conversation. In some embodiments, a sound profile may also include information identifying the sound itself, such as a dog barking, footsteps of a character, or a car engine. In some embodiments, the content presentation system 100 suppresses sounds to emphasize additional sounds (e.g., added sound objects). In other embodiments, the content presentation system 100 suppresses background sounds to promote a specific metric, such as reducing screen time.

Figure 14:
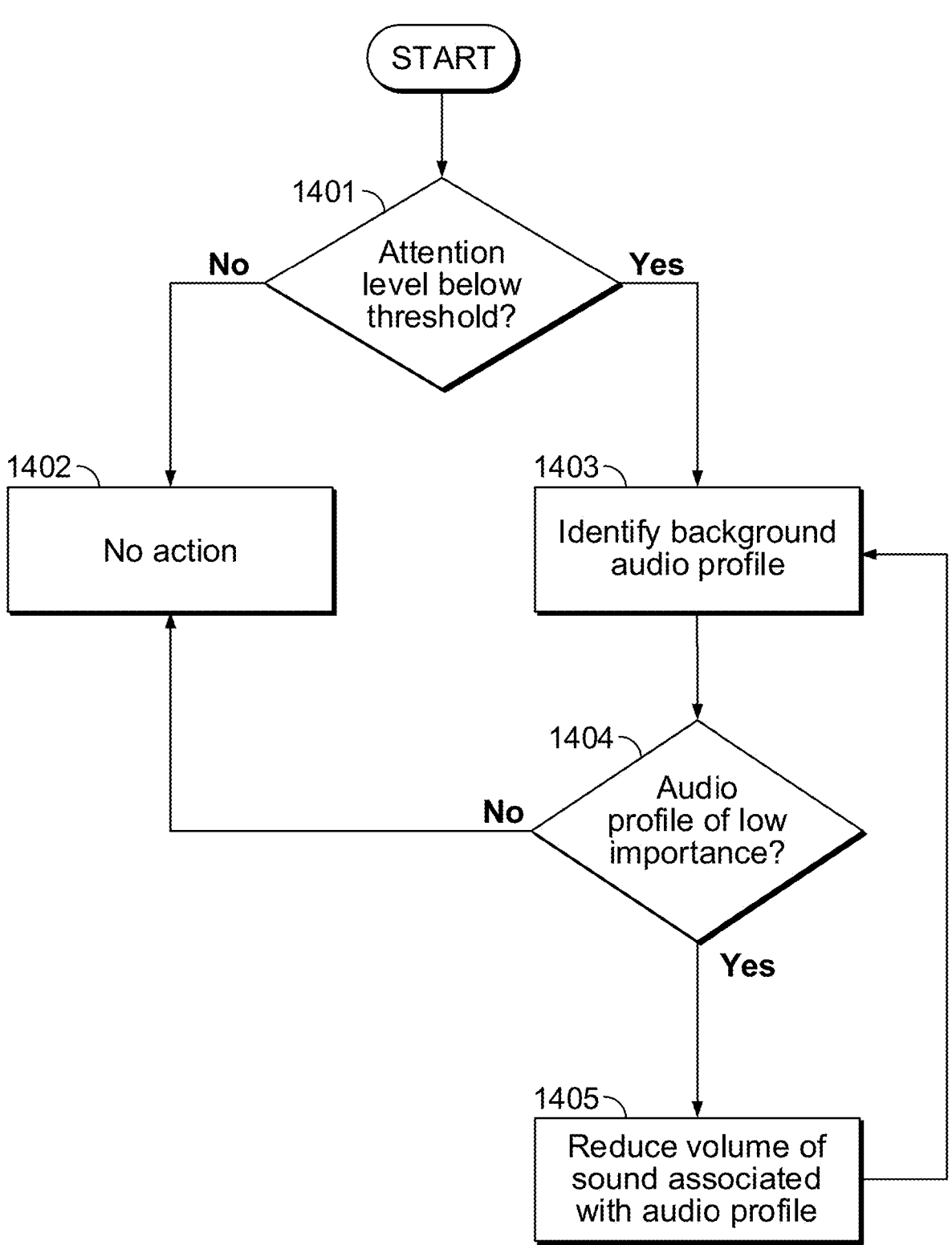
FIG. 14 shows an example process of reducing background sound in accordance with some embodiments of the present disclosure.

An example process for suppressing background sound is shown in FIG. 14. At step 1401, the content presentation system 100 determines whether an attention level is below the threshold. If the attention level is not below the threshold, the process moves to step 1402, at which no action is taken. If the attention level is below the threshold, the content presentation system will likely present additional sounds. In preparation, content presentation system 100 identifies a background audio profile at step 1403. Such identification may be by audio processing software or metadata, for example. In some embodiments, the content stream includes metadata that includes additional information about frames or other aspects of the content. At 1404 the content presentation system 100 determines whether the background audio profile is of low importance. This determination may be based on metadata or video scene understanding in some embodiments. If the content presentation system 100 determines at step 1404 that the background audio profile is of low importance, it moves to step 1405, at which is reduces the volume of sound associated with the background audio profile. For example, the background audio profile may represent music or ambient noise that does not contribute to ambiance or plotline. Such sounds may be reduced without impacting understanding. The content presentation system 100 then returns to step 1403 to identify remaining background audio profiles. In the event that the background audio profile is not of low importance at step 1404, for example, if the background audio profile represents waves that give clues as to setting, the content presentation system 100 returns to step 1402, at which it performs no action.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in an embodiment may be applied to any other embodiment herein, and flowcharts or examples relating to an embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating for output, on a device comprising a display, a content item, the content item comprising a visual component and an audio component;

determining, using at least one sensor, an attention level of a user of the device respective to at least a portion of the visual component of the content item;
   identifying at least one object depicted in the visual component of the content item;
   based on determining that the attention level of the user at a first time is below a threshold attention level:
       based on determining that the audio component lacks sound attributable to the at least one object, generating at least one additional audio component for the at least one object; and
       generating for output the at least one additional audio component simultaneously with the audio component; and
   based on determining that the attention level of the user is above the threshold attention level at a second time after the first time, modifying the output of the content item to cease playing the at least one additional audio component.

2. The method of claim 1, wherein the generating for output the at least one additional audio component is performed gradually creating at least one of fade-in effect or fade-out effect.

3. The method of claim 1, further comprising monitoring the attention level of the user while generating for output the content item using one of eye tracking or activity recognition.

4. The method of claim 1, further comprising selecting, from a list of additional audio components, the at least one additional audio component based on the determining that the audio component lacks sound attributable to the at least one object, wherein the selected at least one additional audio component is related to a context of the content item.

5. The method of claim 4, further comprising selecting, from the list of additional audio components, the at least one additional audio component based on a storyline of the content item.

6. The method of claim 1, wherein:
   the determining the attention level of the user of the device comprises determining that the attention level is above a threshold for a first region of the visual component, and that the attention level is below the threshold for a second region of the visual component; and
   the identifying the at least one object depicted in the visual component of the content item comprises identifying an object in the second region of the visual component.

7. The method of claim 1, further comprising based on determining that the attention level of the user at the first time is below the threshold attention level:
   analyzing the audio component of the content item to identify at least one background audio profile of the audio component;
   selecting at least one background audio profile based on an importance of the selected at least one background audio profile; and
   modifying a volume of sound associated with the selected at least one background audio profile in the audio component.

8. The method of claim 7, wherein the importance of the at least one background audio profile is based on at least a storyline of the content item, metadata of the content item, or scene analysis.

9. The method of claim 1, further comprising, based on determining that the attention level of the user at the first time is below the threshold attention level, reducing a bitrate of the visual component of the content item.

10. The method of claim 9, further comprising, based on determining that the attention level of the user at the first time is below the threshold attention level, modifying volume.

11. The method of claim 1, wherein determining that the audio component lacks sound attributable to the at least one object is based on metadata of the content item or analyzing the audio component of the content item.

12. The method of claim 1, wherein the generating for output at least one additional audio component simultaneously with the audio component comprises generating for output the at least one additional audio component at a first timepoint in the content item prior to a second timepoint in the content item, wherein the at least one object is depicted in the visual component of the content item at the second timepoint.

13. The method of claim 1, wherein the identifying at least one object depicted in the visual component of the video content item is performed using a computer vision algorithm.

14. The method of claim 1, wherein the generating at least one additional audio component for the at least one object is based on a storyline, a context, or metadata of the content item.

15. The method of claim 1, further comprising:
determining a position of the at least one object; and
wherein the generating for output the at least one additional audio component simultaneously with the audio component comprises generating for output the at least one additional audio component according to the determined position.

16. A system comprising:
processing circuitry configured to:
generate for output, on a device comprising a display, a content item, the content item comprising a visual component and an audio component;

determine, using at least one sensor, an attention level of a user of the device respective to at least a portion of the visual component of the content item;
identify at least one object depicted in the visual component of the content item;
based on determining that the attention level of the user at a first time is below a threshold attention level:
based on determining that the audio component lacks sound attributable to the at least one object, generate at least one additional audio component for the at least one object; and
generate for output the at least one additional audio component simultaneously with the audio component; and
based on determining that the attention level of the user is above the threshold attention level at a second time after the first time, modify the output of the content item to cease playing the at least one additional audio component.

17. The system of claim 16, wherein the generating for output the at least one additional audio component is performed gradually creating at least one of fade-in effect or fade-out effect.

18. The system of claim 16, the processing circuitry further configured to monitor the attention level of the user while generating for output the content item using one of eye tracking or activity recognition.

19. The system of claim 16, the processing circuitry further configured to select, from a list of additional audio components, the at least one additional audio component based on the determining that the audio component lacks sound attributable to the at least one object, wherein the selected at least one additional audio component is related to a context of the content item.

20. The system of claim 19, further comprising selecting, from the list of additional audio components, the at least one additional audio component based on a storyline of the content item.

* * * * *